US006676341B1

United States Patent
Lippincott

(10) Patent No.: US 6,676,341 B1
(45) Date of Patent: Jan. 13, 2004

(54) UTILITY POLE DRILLING JIG

(75) Inventor: Thomas E. Lippincott, Rocky Point, NC (US)

(73) Assignee: Tank Fab, Inc., Rocky Point, NC (US)

( * ) Notice: Subject to any disclaimer, the term of this patent is extended or adjusted under 35 U.S.C. 154(b) by 41 days.

(21) Appl. No.: 10/192,303

(22) Filed: Jul. 9, 2002

(51) Int. Cl.$^7$ ................................................ B23B 45/14
(52) U.S. Cl. ........................ 408/92; 408/97; 408/115 R
(58) Field of Search ........................... 408/92, 97, 115 R

(56) References Cited

U.S. PATENT DOCUMENTS

| 806,171 A | * | 12/1905 | Moye ........................... 408/92 |
| 2,273,954 A | * | 2/1942 | Grass ....................... 408/115 R |
| 3,090,260 A | | 5/1963 | Brooks et al. |
| 3,110,184 A | * | 11/1963 | Gruelzman ............... 73/864.45 |
| 3,617,140 A | * | 11/1971 | Gates .......................... 408/1 R |
| 4,030,854 A | | 6/1977 | Grannis |
| 4,094,612 A | | 6/1978 | Krieg |
| 4,936,720 A | | 6/1990 | Dolatowski et al. |
| 5,560,408 A | * | 10/1996 | DiFranco .................. 144/144.1 |
| 5,743,684 A | * | 4/1998 | Rex ......................... 408/115 R |
| 5,807,033 A | | 9/1998 | Benway |
| 5,919,009 A | | 7/1999 | Stephenson |
| 5,925,368 A | | 7/1999 | Voris et al. |
| 6,019,551 A | * | 2/2000 | Stephenson ................... 408/92 |
| 6,237,305 B1 | | 5/2001 | Landers |

* cited by examiner

*Primary Examiner*—Daniel W. Howell
(74) *Attorney, Agent, or Firm*—MacCord Mason PLLC

(57) ABSTRACT

The present invention is a drilling jig for drilling a plurality of holes into a utility pole above and below the pole's ground level line to facilitate the penetration of a preservative, thereby preventing rotting of the pole at ground level. The drill jig consists of a plate having a topside, an underside, an upper edge, a bottom edge, a first side edge and a second side edge. The plate includes a set of through-bores for guiding a drill bit into the utility pole. At least one elongated guide arm is secured proximal one of the plate side edges and extends downwardly transverse the plate. At least one lashing member for lashing the plate to the utility pole has a first end securable to at least one attachment point proximal the plate first side edge and a second end that is releasibly attachable to at least one attachment point proximal the plate second side edge.

20 Claims, 3 Drawing Sheets

UTILITY POLE DRILLING JIG

BACKGROUND OF THE INVENTION

(1) Field of the Invention

The present invention relates to a drilling jig for a utility pole. In particular, the invention can be used to accurately and efficiently drill a plurality of equally spaced angled holes into a utility pole to facilitate penetration of a preservative into the pole.

(2) Description of the Prior Art

Wooden utility poles are used worldwide to carry overhead cables for electric, telephone and cable TV services. About 130 to 160 million poles are currently in use in the United States alone. These poles may have an average service life of 30 years. Commonly, utility poles are put into the ground about 5 feet. After the first 20 years, poles are inspected at ground level for rot, and are treated, thereby extending the life of the pole. Poles are most susceptible to decay near the ground-line. To prevent decay, sometimes a "ground-line bandage" can be prepared with pentachlorophenol and grease and wrapped around the post. Alternately, chloropicrin or metam-sodium can be injected into drilled holes, which are then plugged with dowels.

U.S. Pat. No. 6,237,305 to Landers teaches a method for in-situ treatment of wood utility poles. Lander's process involves excavating an area around the base of a wood pole supported in the earth and drilling a plurality of holes in the wood pole for injecting an isophorone containing compounds into the pole. A preselected coating is used to coat a portion of the pole adjacent the excavated area with a preselected compound containing an isophorone solvent and then covering the coated portion of the pole with a covering wrap prior to refilling the excavated area around the wooden pole for treating the pole in-situ for preventing decay.

Until the present invention, there has not been any efficient method or apparatus suitable for drilling an array of holes necessary for a complete ground-line preservative treatment of a wooden utility pole. What is needed is an apparatus that can align a drill at an individual location within a plurality of locations on a utility pole making it possible to bore an array of accurate treatment holes in a quick and efficient manner.

SUMMARY OF THE INVENTION

The present invention is directed to a drilling jig for drilling an array of holes into a utility pole to facilitate the penetration of a preservative, thereby preventing rotting of the pole at ground level. The drilling jig comprises a plate having parallel topside and underside planar surfaces, an upper edge, a lower edge, a first side edge and a second side edge. The plate is generally rigid and can be made from rigid materials such as, but is not limited to metal, wood, plastic, fiberglass, carbon fiber, Kevlar or composite materials. Aluminum has been found to be a particularly useful material for constructing the drilling jig of the present invention, due to its low cost, machineability, durability and light weight.

The plate further includes a set of through-bore guide holes for guiding a drill bit into a utility pole. Preferably, the set of through-bores is arrayed in a rectangular pattern having top and bottom rows, inside rows and outside columns located such that a handheld drill can be guided to drill spaced holes within a predetermined distance of outer-surface of the largest diameter pole to be drilled. Furthermore, the angled drill bit guide holes are spaced at an equidistance of each other and extend through the plate. The through-bores can have a diameter between a range of ¼ inch and ½ inch. Moreover, the array of through-bore guide holes should be longitudinally dimensioned such that a rectangular pattern of holes can extend at least four feet above and below the ground-line of the pole being drilled. The length and width of the plate is dimensioned to accommodate the array of through-bores. However, the length and width of the plate can be of increased proportions to accommodate other preferable members of the drill jig such as guide arms, lashing attachment points, spacer bars and handholds.

The thickness of the plate is such that each through-bore has an axial length sufficient for guiding a handheld drill to drill a hole in a utility pole substantially within ten degrees of perpendicular of the plate's planar surfaces. It is preferable that the array of holes resulting from the use of the present invention, slope downwardly towards the ground end of the drilled pole. The downward slope of the holes provides drainage preventing water from standing inside the drilled holes for long periods of time. It has been determined that holes sloping downward at an angle between the range of three to ten degrees from perpendicular the longitudinal axis of the drilled pole provide good drainage. Moreover, a level can be included as a member of the drill jig to orient the drill jig into an optimal position for drilling.

An additional feature included with the drilling jig is a number of spacer bars fixed to the underside surface of the drill jig plate. The spacer bars hold the drill jig plate far enough off the surface of the pole being drilled to allow drill shavings to fall away from the holes being drilled. The spacer bars can extend directly from one side edge to the other. One spacer bar can be extended midway between the upper edge and lower edge of the plate separating the drill jig into a below ground-line section that includes the lower edge and an above ground-line section that includes the upper edge.

The drill jig further includes at least one elongated guide arm secured proximal to one of the edges of the plate and extending downwardly transverse the plate. The preferred embodiment includes two guide arms, each secured near the same plate side edge, but substantially separated by distance along the plate side edge with a first guide arm being located in the below ground-line section and a second guide arm being located in the above ground-line section. Each guide arm preferably includes an abutment face for contacting the surface of the pole and for aligning the drill jig into proper lateral position against the sides of the pole being drilled.

Also, at least one lashing member is provided for lashing the drill jig to the utility pole being drilled. Preferably a pair of lashing members is provided. Each lashing member has a first end securable to an attachment point proximal to the drill jig plate's first side edge and a second end that is releasibly attachable to an attachment point proximal to the plate's second edge. Moreover, each lashing member can be an element in an adjustable lashing clamp assembly that further includes a tensioning device. Part of the tensioning device can be the second end of the lashing member adapted to adjust the tension of the lashing member.

In the preferred embodiment, the second end of the lashing member consists of a threaded rod integrally attached longitudinally to the end of a chain or cable making up the lashing member. An attachment point is a through-bore with a diameter large enough to accept insertion of the threaded rod.

Each adjustable lashing clamp assembly further includes a tensioning knob for increasing or decreasing the tension of its respective lashing member. Each tensioning knob has internal threads matching external threads of the threaded rod of its respective lashing member. When under tension the threaded rod of a lashing member extends through an attachment point to just above the top planar surface of the drill jig plate. A tensioning knob threaded onto the threaded rod applies tension to the lashing member by applying a counterforce against the top planar surface of the plate.

A convenient feature of the drill jig includes oval handhold cutouts large enough for an adult's palm preferably positioned within the drill jig plate at locations near both side edges. The handhold cutouts can be used to manually position the drill jig on a utility pole to be drilled.

In operation, users of the drill jig begin the drilling process by supporting the ground end of a utility pole above ground surface, preferably positioning the pole in a horizontal position. For example, the ground end of the pole to be drilled can be positioned and supported such that it overhangs the end of a support structure. Next, the drill jig is positioned against the pole such that the longitudinal axis of the drill jig is parallel to the longitudinal axis of the ground end of the pole. The position of the drill jig is adjusted along the longitudinal axis of the pole until the below ground-line section of the plate is below the pole's ground-line and the above ground-line section of the plate is above the pole's ground-line. The position of the drill jig is further adjusted until the abutment faces of the guide arms are in contact with the outer-surface of the pole.

Once properly positioned, the drill jig is ready to be lashed to the pole. The first ends of the lashings are secured to attachment points near the first side edge if not already secure. Next, each lashing is passed around pole on the side of the pole opposite the drill jig. Then, the second end of each lashing is releasibly attached to its respective attachment point near the second edge of the drill jig plate. The tensioning device is then adjusted to add tension to the lashings securing the drill jig such that it is held fast to the pole. At this point, handheld drills can be used to drill a properly placed array of holes above and below the ground line of the pole. Each hole in the pole is drilled by placing the drill bit of a handheld drill into a drill jig through-bore and against the pole. The drill is energized and the drill bit is forced into the pole until the bit travels all the way through the pole or until a desired depth hole is created. The drill bit is then removed and placed into another drill jig through-bore. This process is repeated until the desired number and pattern of holes is completed. The drill jig is then removed from the drilled pole by loosening the tensioning device allowing the drill jig to be taken away from the pole.

While the invention is described herein as a jig to be manually placed on a utility pole, it will be understood that the invention also contemplates systems in which the jig is positioned on the utility pole by powered mechanisms. In such mechanisms, the drill bit or plurality of drill bits, which are guided by the holes in the jig, may be inserted and driven by a powered drive mechanism, instead of by a hand drill operated by an individual.

For example, the jig may be carried on a movable, e.g., hydraulic, arm movable to an operative position to place the jig against the surface of a utility pole. A plurality of bits rotatable by a suitable drive mechanism can then be positioned to align the bits with the holes in the jig, with the bits being extended through the holes and through the utility pole as the bits are rotated. In this configuration, the arm will serve as a positioning member to position the plate relative to the utility pole.

DETAILED DESCRIPTION OF THE INVENTION

In the following description, terms such as horizontal, upright, vertical, above, below, beneath and the like, are used solely for the purpose of clarity in illustrating the invention and should not be taken as words of limitation. The drawings are for the purpose of illustrating the invention and are not intended to be to scale.

Figure 1:
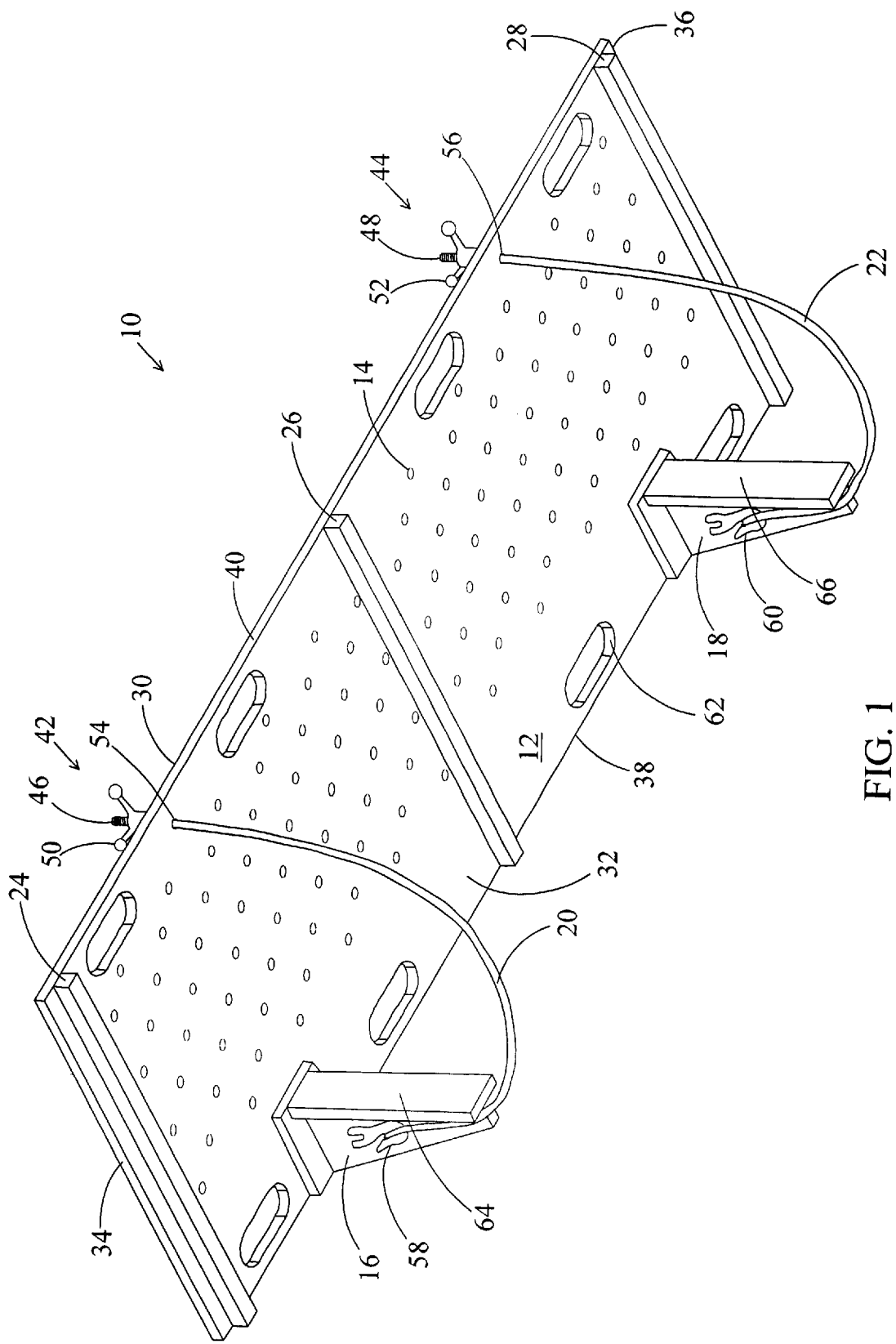
FIG. 1 is a perspective view of the drilling jig of the present invention.

Referring to the drawings and first to FIG. 1, a utility pole drilling jig 10 comprises a rigid plate 12 having an array of through-bores 14 for guiding a drill bit into a utility pole, a pair of guide arms 16 and 18 for positioning plate 12 on the utility pole and a pair of lashing members 20 and 22, for holding plate 12 against the utility pole. Lashing members 20 and 22 can be cables, chains, ropes or straps. Preferably, drilling jig 10 further includes spacer bars 24, 26 and 28 for allowing drill shavings to fall away from a utility pole being drilled.

In particular, plate 12 is a rectangular sheet having a top surface 30 and a bottom surface 32. Topside planar surface 30 and underside planar surface 32 are parallel and are connected by an upper edge 34, a lower edge 36 and side edges 38 and 40. Spacer bars 24 and 28 are attached to bottom surface 32 substantially adjacent to upper edge 34 and lower edge 36, respectively. Spacer bar 26 is attached to bottom surface 32 midway between edges 34 and 36. All three spacer bars, 24, 26 and 28 extend lengthwise across bottom surface 32 directly from first side edge 38 to second side edge 40. Spacer bars 24, 26 and 28 can be fastened to plate 12 using fasteners such as bolts, screws or rivets. Alternately, spacers 24, 26 and 28 can be glued, welded or molded to bottom surface 32.

Lashing clamp assemblies 42 and 44 each consist of a threaded rod and a threaded tensioning knob. Threaded rod 46 is integrally attached to the second end of lashing member 20, whereas threaded rod 48 is integrally attached to the second end of lashing member 22. When in use, threaded rods 46 and 48 extend upwardly through attachment point through-bores, 54 and 56 respectively. Tensioning knob 50 threads onto rod 46 and tensioning knob 52 threads onto rod 48.

Also shown in FIG. 1, the first end of lashing member 20 is secured to an attachment point constructed from a hook 58 attached to guide arm 16. Likewise, the first end of lashing member 22 is secured to attachment point 60. Handholds 62 located near side edges 38 and 40 can be used to position guide arm abutment faces 64 and 66 against a pole to be drilled before lashing members 20 and 22 are tightened.

Figure 2:
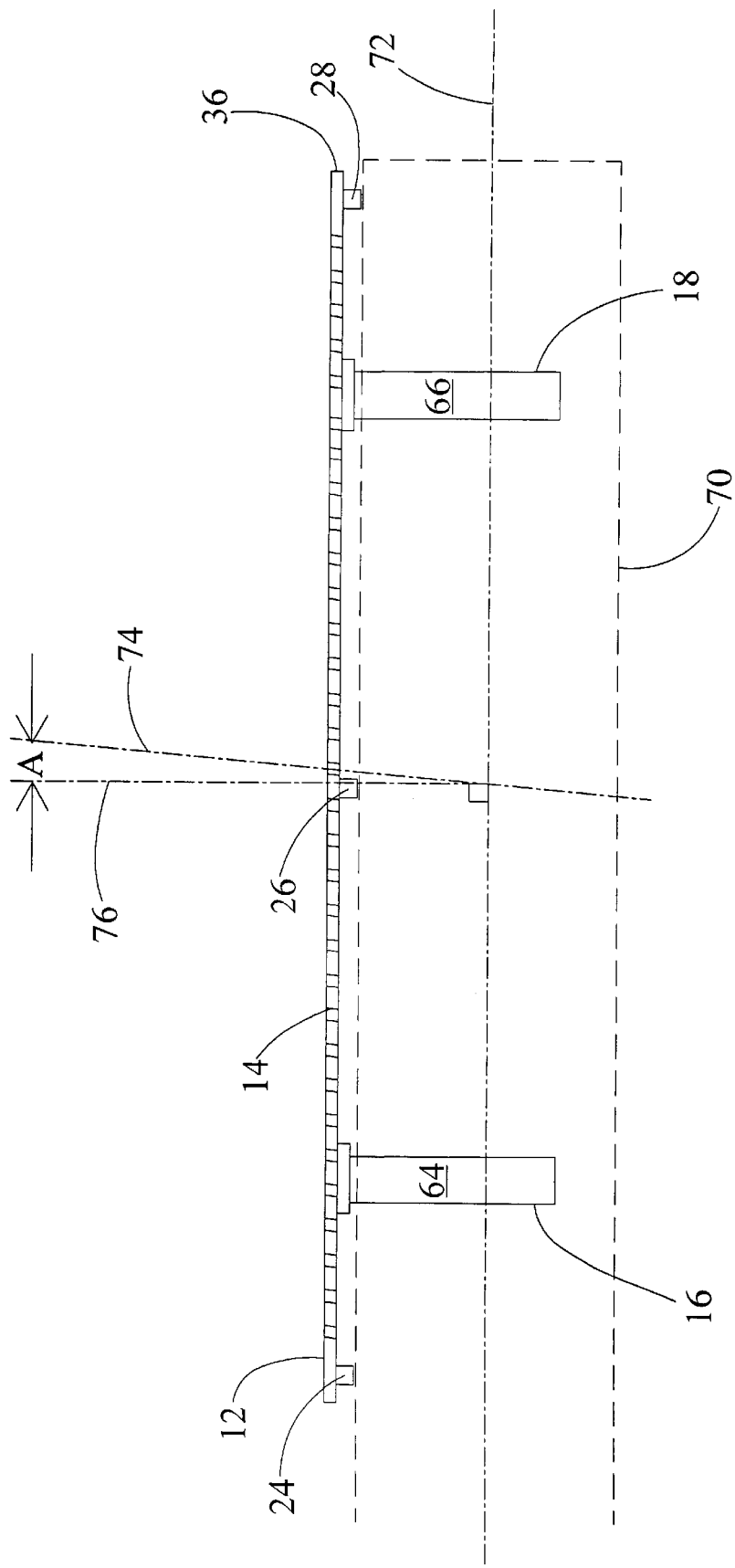
FIG. 2 is a sectional side view of the drilling jig showing the drill axis of the through-bores relative to the pole being drilled.

Turning now to FIG. 2, drill jig 10 shown in side view cross-section rests atop a pole 70. Plate 12 with through-bores 14 lies parallel to pole axis 72. Pole ground line 76 is perpendicular to both pole axis 72 and plate 12. Drill axis 74 represents drill guide alignment for all through-bores 14. Angle A separating ground line 76 from drill guide axis 74 is preferably five degrees offset from line 76 and is sloped towards drill jig lower edge 36.

Figure 3:
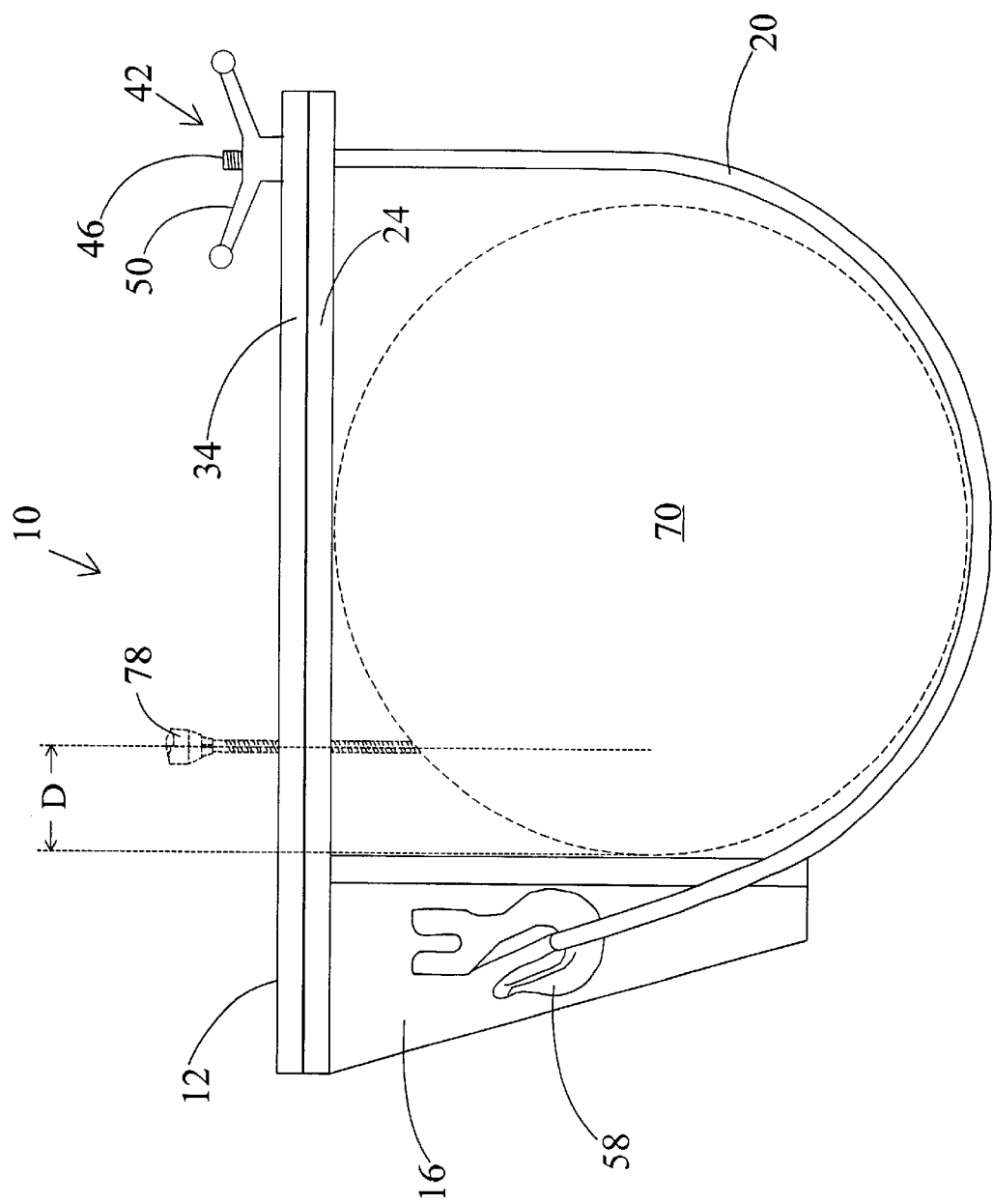
FIG. 3 is an end view of the drilling jig showing a drill boring a hole into a lashed pole.

FIG. 3 depicts an end view of drill jig 10 lashed to pole 70. A handheld drill 78 can sequentially bore preservative treatment holes into pole 70 to within a distance D of about 2 inches or more, e.g., about 2 ½ inches of the side of pole 70.

In operation, users lift and direct drill jig 10 using handhold cutouts 62 to position drill jig 10 onto pole 70. Ideally, drill jig 10 is positioned such that spacebar 26 is directly over pole ground line 76 and the abutment faces 64 and 66 of guide arms 16 and 18 rest against pole 70. If not already secure, the first ends of lashing members 20 and 22 are secured to attachment points 58 and 60. Next, lashing members 20 and 22 are extended around pole 70 and threaded rods 46 and 48 integral to the second ends of lashing members 20 and 22 are passed from underside 32 through plate 12 attachment points 54 and 56.

Tensioning knobs 50 and 52 are then threaded onto threaded rods 46 and 48, respectively until the bottom knobs contact the topside surface 30 of plate 12. Lashing members 20 and 22 are properly tensioned by continuing to rotate knobs 50 and 52 in a direction that pulls knobs 50 and 52 against plate 12 pulling threaded rods 46 and 48 upwardly through attachment points 54 and 56. Lashing members 20 and 22 are considered properly tensioned once drill jig 10 is secured to pole 70 tightly enough to prevent incidental movement of through-bores 14 during the drilling process. The drilling process can now commence by placing a drill bit properly attached to handheld drill 78 into one of selected through-bores 14.

Certain modifications and improvements will occur to those skilled in the art upon a reading of the foregoing description. It should be understood that all such modifications and improvements have been deleted herein for the sake of conciseness and readability but are within the scope of the following claims.

What is claimed is:

1. A drilling jig for drilling a plurality of holes into a utility pole above and below the pole's ground level line to facilitate the penetration of a preservative, thereby preventing rotting of the pole at ground level, said drill jig comprising:
    a) a plate having a topside, an underside, an upper edge, a bottom edge, a first side edge and a second side edge, said plate further including a set of through-bores guide holes for guiding a drill bit into the utility pole;
    b) at least one elongated guide arm secured proximal one of the side edges of said plate, said at least one guide arm extending downwardly transverse to said plate; and
    c) at least one positioning member for positioning said plate relative to the utility pole.

2. The drilling jig of claim 1, wherein said set of through bores is arranged substantially in a rectangular pattern.

3. The drilling jig of claim 1, wherein an axis of each of said through bores is angled within ten degrees of perpendicular of said plate's topside.

4. The drilling jig of claim 1, wherein said through bores have diameters between a range of about ¼ inch and about ½ inch.

5. The drilling jig of claim 1, wherein said positioning member includes a first end securable to at least one attachment point proximal said plate first side edge and a second end that is releasibly attachable to at least one attachment point proximal said plate second side edge.

6. The drilling jig of claim 1, wherein said positioning member is an elongated chain.

7. The drilling jig of claim 1, wherein said positioning member is an elongated cable.

8. A drilling jig for drilling a plurality of angled holes into a utility pole above and below the pole's ground level line to facilitate the penetration of preservatives into the pole, thereby preventing rotting of the pole at ground level, said drilling jig comprising:
    a) a flat rectangular plate having a topside surface, an underside surface, a top edge, a bottom edge and side edges, said plate including a rectangular array of angled drill bit guide holes extending through said plate;
    b) a pair of guide arms adjacent to one of the side edges and extending from said plate for positioning said plate against a utility pole; and
    c) a pair of lashing members each having a first end securable to one of said pair of guide arms and a second end releasibly attachable to at least one attachment point near the side edge of said plate opposite side edge near said pair of guide arms; and
    d) at least two spacers attached to the underside surface of said plate to allow drill shavings to fall away from holes being drilled.

9. The drill jig of claim 8, wherein each of said angled drill bit guide holes extend through said plate towards said plate's bottom edge at an angle between three and ten degrees from perpendicular of said plate's topside surface.

10. The drill jig of claim 8, wherein each of said pair of guide arms extend downwardly for a length sufficient to hold the side edges of said plate parallel to the longitudinal axis of a utility pole to be drilled.

11. The drill jig of claim 8, wherein each of said pair of guide arms have an abutment face for contacting the outside surface of the utility pole to be drilled.

12. The drill jig of claim 8, wherein said at least two spacers are rectangular bars that extend parallel to the top and bottom ends substantially across the underside surface of said plate.

13. A drilling jig for drilling a plurality of angled holes into a utility pole above and below the pole's ground level line to facilitate the penetration of preservatives into the pole, thereby preventing rotting of the pole at ground level, said drilling jig comprising:
    a) a flat rectangular plate having parallel topside and underside surfaces, a top edge, a bottom edge and side edges, said plate including a rectangular array of angled drill bit guide holes spaced at an equidistance of each other and extending through said plate, said array of angled drill bit guide holes having top and bottom rows, inside rows and outside columns;
    b) a pair of guide arms adjacent to one of the side edges and extending from the underside surface of said plate for positioning said plate against a utility pole; and
    c) a pair of lashing members each having a first end securable to one of said pair of guide arms and a second end adapted to adjust the tension of each of said pair of lashing members, said second end of each of said pair of lashing members being releasibly attachable to at least one attachment point near the side edge of said plate opposite side edge near said pair of guide arms;
    d) a pair of adjustable lashing clamp assemblies for tensioning said lashing members to hold said plate against a utility pole; and
    e) spacers attached to the underside surface of said plate to allow drill shavings to fall away from holes being drilled.

14. The drill jig of claim 13, wherein each of said pair of adjustable lashing clamp assemblies include a tension adjustment knob threadable onto a threaded rod integral to the second end of each of said pair of lashing members for adjusting the tension of each of said pair of lashing members.

15. The drill jig of claim 13, wherein said plate has a thickness great enough to provide guiding to a drill bit attached to a handheld drill as the drill bit is guided by any of the through-bores in said plate.

16. The drill jig of claim 13, wherein either outside column of the rectangular array of through-bores in said plate is located to guide a drill along a drill axis that is within a predetermined distance of the outside-surface of the pole to be drilled.

17. The drill jig of claim 13, wherein said attachment points for the first end of each of said pair of lashing members is a hook attached to each of said guide arms.

18. The drill jig of claim 13, wherein said attachment points for the second end of said pair of lashing members are through-bores each having a diameter slightly larger than the diameter of said threaded rods integral to each of said pair of lashing members.

19. The drill jig of claim 13, wherein one of said number of spacer bars is attached to the underside of said plate being usable as a reference for aligning the array of through-bores in said plate equally above and below the ground level line of a pole to be drilled.

20. The drill jig of claim 13, wherein said plate further includes handhold cutouts for manually lifting and positioning said drill jig, said handhold cutouts being located near and along either of said plate side edges.

* * * * *